United States Patent [19]

Loffelman et al.

[11] 4,435,555

[45] Mar. 6, 1984

[54] NOVEL POLYMERIC LIGHT STABILIZERS FOR POLYMERS

[75] Inventors: Frank F. Loffelman, Bridgewater; Thomas E. Brady, Whitehouse Station, both of N.J.

[73] Assignee: American Cyanamid Company, Stamford, Conn.

[21] Appl. No.: 467,106

[22] Filed: Feb. 16, 1983

Related U.S. Application Data

[63] Continuation-in-part of Ser. No. 285,239, Jul. 20, 1981, abandoned.

[51] Int. Cl.$^3$ .............................................. C08F 26/06
[52] U.S. Cl. .................................................... 526/261
[58] Field of Search ......................................... 526/261

[56] References Cited

U.S. PATENT DOCUMENTS

| 2,712,004 | 6/1955 | Thomas | 525/43 |
| 2,712,537 | 7/1955 | D'Alelio | 525/204 |
| 4,086,204 | 4/1978 | Cassandrini et al. | 528/374 |

*Primary Examiner*—Maurice J. Welsh
*Attorney, Agent, or Firm*—Steven J. Hultquist

[57] ABSTRACT

Polymers based upon a monomer of the formula

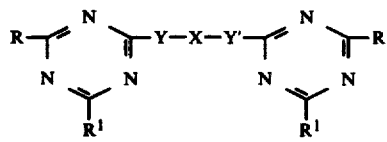

wherein R or R$^1$ contain a polymerizable double bond are useful as ultraviolet light stabilizers for polymers.

6 Claims, No Drawings

NOVEL POLYMERIC LIGHT STABILIZERS FOR POLYMERS

This invention relates to novel polymeric compositions. More particularly, it relates to novel polymeric compositions obtained by the polymerization, or copolymerization, of a monomer, or mixture of monomers, represented by formula (I)

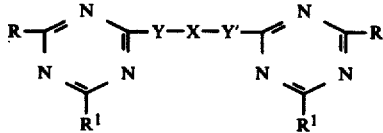

wherein R represents $C_3$–$C_6$ alkenyloxy, $C_3$–$C_6$ alkenylamino, or di($C_3$–$C_6$ alkenyl)amino; $R^1$ represents $C_1$–$C_8$ alkyl, $C_1$–$C_8$ alkoxy, halo, $C_1$–$C_8$ alkylthio, $C_3$–$C_6$ alkenyloxy, amino, $C_3$–$C_6$ alkenylamino, di($C_3$–$C_6$ alkenyl) amino, the groups

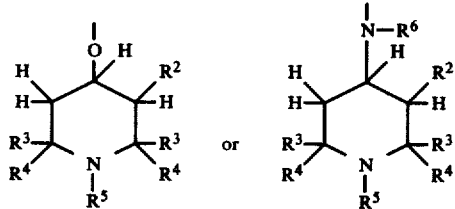

$C_1$–$C_{18}$ alkylamino, di($C_1$–$C_{18}$) alkylamino, morpholino, pyrrolidyl, piperidino, a substituted $C_1$–$C_{18}$ alkylamino, or a substituted $C_1$–$C_{18}$ dialkylamino, wherein the substituents are selected from amino, cyano, carboxy, alkoxycarbonyl wherein the alkoxy moiety has 1 to 8 carbon atoms, and the group

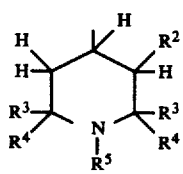

wherein $R^2$ represents hydrogen, $C_1$–$C_8$ alkyl, or benzyl; $R^3$ and $R_4$ independently represents $C_1$–$C_8$ alkyl, benzyl, or phenethyl, or together with the carbon to which they are attached form a $C_5$–$C_{10}$ cycloalkyl; and $R^5$ represents hydrogen, $C_2$–$C_3$ hydroxyalkyl, $C_1$–$C_8$ alkyl, hydroxyl, or oxyl; $R^6$ represents hydrogen, $C_1$–$C_{18}$ alkyl, or the group

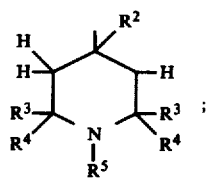

Y and Y', which may be the same, or different, represent oxy, or

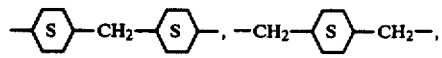

X represents $C_2$–$C_{12}$ alkylene, wherein the alkylene chain may be interrupted by an oxo, thio or

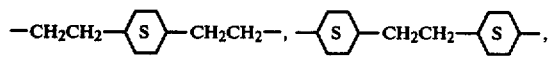

radical, $C_5$–$C_{10}$ cycloalkylene,

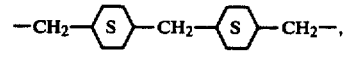

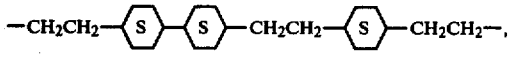

$C_6$–$C_{12}$ arylene, or $C_8$–$C_{14}$ aralkylene; with the proviso that at least one substituent in the compound is, or contains,

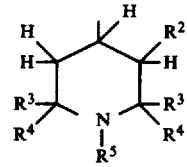

This invention also relates to the use of such polymeric compositions for stabilizing polymers, particularly polyolefins, against degradation by ultraviolet radiation, and to the stabilized compositions.

the preferred monomers of formula (I) are those wherein Y and Y' are

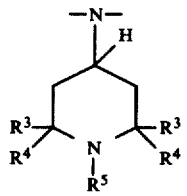

The especially preferred monomers are represented by formula (II).

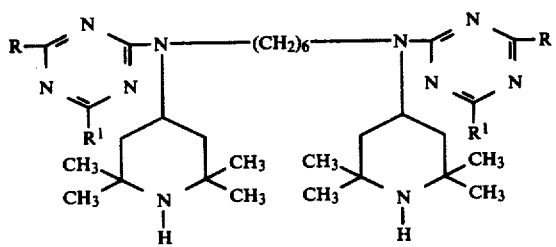

(II)

It is well-known that sunlight and other sources of ultraviolet radiation cause degradation of polymers as evidenced by embrittlement or yellowing of plastic articles made therefrom. It is also well-known that this degradation can be inhibited by use of ultraviolet light stabilizers incorporated in or on such articles. Various additives, used alone or in combinations, have been suggested to inhibit such light degradation in order to prolong the useful lives of articles made from polymers. Since none has been found to be completely satisfactory, research continues in order to find compounds, or combinations of compounds, which will be more satisfactory. The present invention arose out of such research and resulted in the discovery of novel polymers which stabilize polymers against degradation by ultraviolet light.

German Offen No. 2,308,611 discloses bridged 1,3,5-triazines containing allyloxy, methallyloxy, or propallyloxy substituents.

Beyer and Lemke, Chem. Ber. 99(7), 2123-6 (1966) (C.A. 65,8912b) disclose bridged 1,3,5-triazines containing methallyl substituents.

U.S. Pat. No. 4,086,204 discloses polytriazines containing a tetraalkyl piperidine radical, as light stabilizers for polymers.

U.S. Pat. No. 2,712,004 discloses the polymerization of melamines containing N-allyl substituents.

The stabilizers of the present invention offer the following advantages:

(1) excellent light-stabilizing activity,
(2) excellent compatibility with resins,
(3) low volatility,
(4) low extractability from polymers by laundering or dry cleaning, and
(5) excellent oven-aging stability.

The monomeric compounds of formula (I) may be prepared by reacting an appropriately substituted chloro-1,3,5-triazine of formula (III) with an appropriately substituted diol, or diamine, of formula (IV), as illustrated by the following reaction, wherein R, R', X, Y, and Y' are as previously defined.

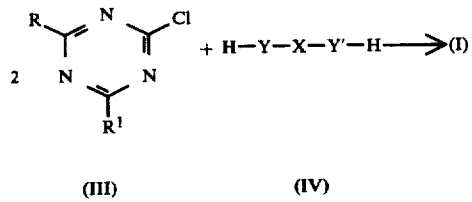

(III)    (IV)

The preparation of suitable compounds of formulas (III) and (IV) is well-known in the art. The preparation of 4,4'-(hexamethylenediimino)bis(2,2,6,6,-tetramethylpiperidine), also known as N,N'-bis(2,2,6,6,-tetramethyl-yl-4-piperidyl)hexamethylenediamine, is disclosed in U.S. Pat. No. 4,104,248.

Some compounds of formula (I) can be prepared by reacting a compound of formula (V) with an appropriate amine or alcohol, as shown below.

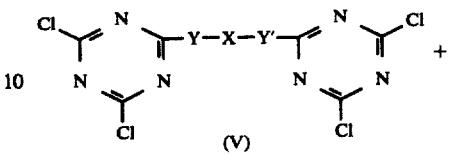

(V)

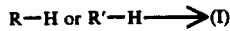

R—H or R'—H ⟶ (I)

the compounds of formula (V) are prepared from cyanuric chloride and an appropriate diol, or diamine, by conventional methods.

Illustrative examples of suitable monomers of formula (I) include the following:

2,2'-[ethylenebis[2,2,6,6-tetramethyl-4-piperidinyl-)imino]]bis[4-allylamino-6-(2-cyanoethyl)amino-1,3,5-triazine], 2,2'-[tetramethylenebis[(2,6-di-n-butyl-2,6-dimethyl-4-piperidinyl)imino]]bis-(4,6-diallyloxy-1,3,5-triazine), 2,2'-[hexamethylenebis[(2,2,6,6-tetramethyl-4-piperidinyl)imino]]bis(4-diallylamino-6-n-hexyl-1,3,5-triazine), 2,2'-[thiodiethylenebis[(2,2,6,6-tetraethyl-4-piperidinyl-)imino]]bis[4-allyl-amino-6-(2-aminoethyl)amino-1,3,5-triazine], 2,2'-[oxydihexamethylenebis](2,2,6,6-tetramethyl-4-piperidinyl)imino]]bis-(4,6-diallyloxy-1,3,5-triazine), 2,2'-[hexamethylenebis[(2,2,6,6-tetramethyl-4-piperidinyl)imino]]bis[4-allyloxy-6-(2-carboxyethyl-)amino-1,3,5-triazine], 2,2'-[hexamethylenebis[(2,2,6,6-tetramethyl-4-piperidinyl)imino]]bis(4-diallyl-amino-6-t-octylamino-1,3,5-triazine), 2,2'-[tetramethylenebis[1-(2-hydroxyethyl)-2,2,6,6-tetramethyl-4-piperidinyl]imino]-bis(4,6-di-methallyloxy-1,3,5-triazine), 2,2'-[hexamethylenebis[(1-oxy-2,2,6,6-tetramethyl-4-piperidinyl)imino]]bis-(4,6-(3-butenyl)amino-1,3,5-triazine), 2,2'-[hexamethylenebis[(1-hydroxy-2,2,6,6-tetramethyl-4-piperidinyl)imino]]bis-4,6-diallylamino-1,3,5-triazine), 2,2'-[hexamethylenebis[(2,2,6,6-tetramethyl-4-piperidinyl)imino]]bis-(4-diallylamino-6-methoxy-1,3,5-triazine), 2,2'-[hexamethylenebis[(2,2,6,6-tetramethyl-4-piperidinyl)imino]]bis(4-allyloxy-6-diethylamino-1,3,5-triazine), 2,2'-[trimethylenebis[(2,2,6,6,-tetramethyl-4-piperidinyl)imino]]bis(4-allyloxy-6-n-butoxy-1,3,5-triazine), 2,2'-[hexamethylenebis[(2,2,6,6-tetramethyl-4-piperidinyl)imino]]bis(4,6-dimethallyloxy-1,3,5-triazine), 2,2'-[hexamethylenebis[(2,2,6,6-tetramethyl-4-piperidinyl)imino]]bis(4-chloro-6-dimethallylamino-1,3,5-triazine), 2,2'-[hexamethylenebis[(2,2,6,6-tetramethyl-4-piperidinyl)imino]]bis(4,6-di(5-hexenyl)amino-1,3,5-triazine), 2,2'-(hexamethylenediimino)bis[4-allyloxy-6-(2,2,6,6-tetramethyl-4-piperidinyl)amino-1,3,5-triazine], 2,2'-(hexamethylenediimino)bis[4-methallyloxy-6-(2,2,6,6-tetraethyl-4-piperidinyl)-amino-1,3,5-triazine], 2,2'-(hexamethylenediimino)bis[4-methallyloxy-6-(2,2,6,6-tetramethyl-4-piperidinyl)-oxy-1,3,5-triazine], 2,2'-[ethylenebis[(2,2,6,6-tetramethyl-4-piperidinyl)imino]]bis[4,6-di(3-butenyl)amino-1,3,5-triazine], 2,2'-[hexamethylenebis[(2,2,6,6-tetramethyl-4-piperidinyl)imino]]bis(4-allyloxy-6-ethylthio-1,3,5-triazine), 2,2'-[hexamethylenebis[(2,2,6,6-tetramethyl-4-piperidinyl)imino]]bis(4-allylamino-6-morpholino-1,3,5-triazine), 2,2'-[dodecamethylenebis[(2,2,6,6-tetramethyl-4-piperidinyl)imino]]bis(4-diallylamino-6-piperidino-1,3,5-triazine), 2,2'-[hexamethylenebis[(2,2,6,6-tetramethyl-4-piperidinyl)imino]]bis(4-diallylamino-6-pyrrolidyl-1,3,5-triazine), 2,2'-[iminodiethylene[(2,2,6,6-tetramethyl-4-piperidinyl)imino]]bis(4,6-diallyloxy-1,3,5-triazine), 2,2'-[1,4-cyclohexylenebis[(2,2,6,6-tetramethyl-4-piperidinyl)imino]]bis-[4-diallylamino-6-(2-ethoxycarbonylethyl)amino-1,3,5-triazine], 2,2'-[methylenedi-4,1-cyclohexylenebis[(1,2,2,6,6-pentamethyl-4-piperidinyl)-imino]]bis(4,6-diallyloxy-1,3,5-triazine), 2,2'-(hexamethylenediimino)bis[4-allyloxy-6-(2,2,3,6,6-pentamethyl-4-piperidinyl)amino-1,3,5-triazine], 2,2'-[1,4-cyclohexylenebis(methylene)]bis[4-allylamino-6-(2-benzyl-2,6,6-trimethyl-4-piperidinyl)amino-1,3,5-triazine], 2,2'-(hexamethylenebis[7-azadispiro[5.1.5.3]hexadecan-15-yl)imino]bis(4,6-diallyloxy-1,3,5-triazine), 2,2'-(hexamethylenediimino)bis[4-allylamino-6-(7-azadispiro[5.1.5.39hexadecan-15-yl)amino-1,3,5-triazine], 2,2'-[iminobis[[2,1-ethanediyl](2,2,6,6-tetramethyl-4-piperidinyl)imino]]bis(4,6-diallyloxy-1,3,5-triazine), 2,2'-[1,4-cyclohexylenebis(ethylene)]bis[4-allylamino-6-(2,2,6,6-tetramethyl-4-piperidinyl)amino-1,3,5-triazine], 2,2'-[1,4-cyclohexylenebis[(2,2,6,6-tetramethyl-4-piperidinyl)imino]]bis(4,6-diallyloxy-1,3,5-triazine), 2,2'-[1,4-phenylenebis[(2,2,6,6-tetramethyl-4-piperidinyl)imino]]bis(4,6-diallyloxy-1,3,5-triazine), 2,2'-[1,4-(phenylenedimethylene)bis[(2,2,6,6-tetramethyl-4-piperidinyl)imino]]bis(4,6-dimethallyloxy-1,3,5-triazine), 2,2'-[hexamethylenebis(methylimino)]bis[4-allylamino-6-(2,2,6,6-tetramethyl-4-piperidinyl)amino-1,3,5-triazine], 2,2'-[hexamethylenebis(n-hexylimino)]bis[4-diallylamino-6-(2,2,6,6-tetramethyl-4-piperidinyl)amino-1,3,5-triazine], 2,2,'-(hexamethylenedioxy)bis[4-diallylamino-6-(2,2,6,6-tetramethyl-4-piperidinyl)amino-1,3,5-triazine], 2,2'-(ethylenedioxy)bis[4-allyloxy-6-(2,2,6,6-tetramethyl-4-piperidinyl)amino-1,3,5-triazine], 2,2'-(dodecamethylenedioxy)bis[4-diallylamino-6-(2,2,6,6-tetramethyl-4-piperidinyl)amino-1,3,5-triazine], 2,2'-(thiodiethylenedioxy)bis[4-diallylamino-6-(2,2,6,6-tetramethyl-4-piperidinyl)oxy-1,3,5-triazine], 2,2'-[hexamethylenebis[2-benzyl-2,6,6-trimethyl-4-piperidinyl)imino]]bis(4,6-diallyloxy-1,3,5-triazine), 2,2'-[hexamethylenebis[2-phenethyl-2,6,6-trimethyl-4-piperidinyl)imino]]bis-(4,6-diallyloxy-1,3,5-triazine), and the like.

In preparing the polymers of the present invention, a monomer of formula (I), or a mixture of a monomer of formula (I) and any copolymerizable comonomer, is polymerized employing an effective amount of a polymerization catalyst. Suitable polymerization catalysts include 2,2'-azobisisobutyronitrile, di-(t-butyl)peroxide, dilaurylperoxide, lauroyl peroxide, benzoyl peroxide, acetyl peroxide, t-butyl hydrogen peroxide, ammonium persulfate, potassium persulfate, and the like. The preferred catalyst is 2,2'-azobisisobutyronitrile.

The monomer of formula (I) may be homopolymerized, or copolymerized by utilizing a copolymerizable comonomer, in emulsion or solution by conventional methods. Suitable comonomers are disclosed in U.S. Pat. No. 2,712,004, the general disclosure of which is hereby incorporated herein by reference thereto.

The polymers of this invention are useful as light stabilizers for thermoplastic substrates such as polyolefins, polyesters, polyethers, polyurethanes, polystyrenes, high-impact polystyrenes, and the like. Preferably, the thermoplastic substrate is a polyolefin.

Other organic materials susceptible to degradation by the effects of light, the properties of which are improved by the incorporation therein of a polymer of this invention, include natural and synthetic rubbers; the latter include, for example, homo-, co- and terpolymers of acrylonitrile, butadiene and styrene, and blends thereof.

The polymers of this invention are particularly useful in polyolefins, such as polyethylene, polypropylene, polybutylene, and the like, and copolymers thereof.

Generally, the compositions comprise a polymer containing from about 0.1% to about 5% by weight of the polymer of the invention, based on the weight of the polymeric substrate.

Preferably, the composition comprises a polyolefin containing from about 0.2% to about 2% by weight of the polymer, based on the weight of the polyolefin.

Optionally, the compositions may contain other additives, especially additives useful in polyolefins, such as antioxidants, supplemental light stabilizers, plasticizers, flame retardants, antistatic and antislipping agents, fillers, dyes, pigments, and the like.

Suitable antioxidants include those of the hindered phenol type, such as 2,6-di-t-butyl-p-cresol; 4,4'-methylenebis(2,6-di-t-butylphenol); 4,4'-methylenebis(2,6-diisopropylphenol); 2,4,6-tri-t-butylphenol; 2,2'-thiobis(4-methyl-6-tbutylphenol); octadecyl 2(3',5'-di-t-butyl-4'-hydroxyphenyl)propionate, etc; esters of thiodipropionic acid, such as dilauryl thiodipropionate and distearyl thiodipropionate, etc; hydrocarbyl phosphites, such as triphenyl phosphite, trinonyl phosphite, diisodecyl pentaerythrityl diphosphite, diphenyldecyl phosphite, etc; and combinations thereof.

Suitable supplemental light stabilizers include those of the benzotriazole class, such as 2-(2'-hydroxy-5-t-octylphenyl)benzotriazole; 2-(2'-hydroxy-3',5'-ditbutylphenyl-5-chlorobenzotriazole; those of the hydroxybenzophenone type, such as 2-hydroxy-4-methoxybenzophenone; 2-hydroxy-4-octyloxybenzophenone; 2,2'-dihydroxy-4,4'-dimethoxybenzophenone; hindered phenol esters, such as n-hexadecyl 3,5-di-t-butyl-4-hydroxybenzoate, and 2',4'-di-t-butylphenyl 3,5-di-t- butyl-4-hydroxybenzoate; metal complexes, such as nickel complexes of 2,2'-thiobis(4-t-octylphenol); nickel butylamine complex of 2,2'-thiobis(4-t-octylphenol); nickel complexes of bis(4-toctylphenyl) sulfone; nickel dibutyl dithiocarbamate; nickel salts of 4-hydroxy-3,5-di-t-butylbenzyl phosphonic acid monoalkyl esters where alkyl is methyl, ethyl, propyl, butyl, etc; nickel complex of 2-hydroxy-4-methylphenyl undecyl ketone oxime, etc. Further illustrative examples of suitable antioxidants and supplemental light stabilizers can be found in U.S. Pat. No. 3,723,427, columns 3 and 4 of U.S. Pat. Nos. 3,488,290 and 3,496,134, and in the other patents mentioned therein.

As with the polymer of the invention, the additive is advantageously employed within the range from about 0.2% to about 2% by weight, based on the weight of the untreated polymer.

The polymer may be incorporated into the polymeric substrate by any of the known techniques for compounding additives with a polymer. For example, the polymer and the additive may be compounded by dry blending with the substrate in powder or granular form, followed by milling, Banbury mixing, molding, casting, extruding, swelling, and the like. Alternatively, the polymer may be added, as a solution or slurry in a suitable inert solvent, or dispersant, to the polymeric substrate in powder or granular form, the whole mixed intimately in a mixer, and the solvent subsequently removed. As a further possibility, the polymer may be added to the polymeric substrate during the preparation of the latter, for instance at the latex stage of polymer production, to provide prestabilized polymer material.

The following examples illustrate the present invention. All parts and percentages are by weight unless otherwise indicated.

EXAMPLE 1

Polymer of 2,2'-[Hexamethylenebis[(2,2,6,6-tetramethyl-4-piperidinyl)imino]]bis(4,6-diallylamino-1,3,5-triazine)

Dry dioxane (13 grams) is purged with nitrogen for 45 minutes, and 2,2'-[hexamethylenebis[(2,2,6,6-tetramethyl-4-piperidinyl)imino]]bis(4,6-diallylamino-1,3,5-triazine) (9.5 grams) is added thereto. The mixture is purged with nitrogen for an additional 35 minutes, and the nitrogen stream is then directed above the surface of the mixture. The temperature is raised to dissolve the crystals and then 2,2'-azobisisobutyronitrile (0.42 gram) is added to the solution. The temperature is raised to 65° C. and held there for 24 hours while stirring and passing nitrogen over the surface of the reaction mixture. The gel-like insoluble material is recovered by filtration, stirred in petroleum ether, recovered again by filtration and dried to obtain 3.5 grams of polymer which does not melt at up to 300° C.

EXAMPLE 2

Polymer of 2,2'-[Hexamethylenebis[(2,2,6,6-tetramethyl-4-piperidinyl)imino]]bis(4,6-diallyloxy-1,3,5-triazine)

A mixture of 2,2'-[hexamethylenebis[(2,2,6,6-tetramethyl-4-piperidinyl)imino]]bis(4,6-diallyloxy-1,3,5-triazine) (8.0 grams) and dioxane (15 mls) is purged with nitrogen for 30 minutes and 2,2'-azobisisobutyronitrile (1.0 gram) is added thereto. The reaction mixture is stirred and heated at 60° C. for 68 hours while passing a stream of nitrogen above the surface of the mixture. An additional 0.5 gram of 2,2'-azobisisobutyronitrile is then added to the mixture and heating is continued at 60° C. for 24 hours. An additional 0.5 gram of 2,2'-azobisisobutyronitrile is added to the mixture and heating is continued at 60° C. for another 24 hours. The reaction mixture is then poured into petroleum ether (200 mls) and the resultant solid is recovered by filtration and dried in a vacuum oven. The product softens at 120° C. and decomposes at 156°–160° C. It has a molecular weight of 3000.

EXAMPLE 3

Polymer of 2,2'-[Hexamethylenebis[(2,2,6,6-tetramethyl-4-piperidinyl)imino]]bis(4-diallylamino-6-methoxy-1,3,5-triazine)

2,2'-[Hexamethylenebis[(2,2,6,6-tetramethyl-4-piperidinyl)imino]]bis(4-diallylamino-6-methoxy-1,3,5-triazine) (10 grams) is dissolved in dry dioxane (15 grams) at 40° C. and the solution is purged with dry nitrogen for 30 minutes. The solution is heated to 60° C., under a nitrogen atmosphere, and 2,2'-azobisisobutyronitrile (0.5 gram) is added thereto. The reaction mixture is then stirred at 60° C. for 24 hours. At this point, additional 2,2'-azobisisobutyronitrile (0.25 gram) is added to the reaction mixture and stirring is continued at 60° C. for another 24 hours. An additional 0.25 gram of 2,2'-azobisisobutyronitrile is added and stirring is continued at 60° C. for another 24 hours. The reaction mixture is then added to petroleum ether (200 mls) and the resulting white precipitate is recovered by filtration and dried under vacuum to obtain 5.6 grams of product which softens at 110° C. and effervesces at 160°–170° C.

EXAMPLES 4–6

Testing in Polypropylene

The compounds of Examples 1–3 (0.25 gram) are separately dry blended with a mastermix of 100 grams of unstabilized polypropylene (Pro-fax ® 6401) and 0.1 gram of a processing antioxidant, 2,4,6-tri-t-butylphenol. The blend is milled at 350°–370° F. for five minutes, and then compression molded at 400° F. into a film 4–5 mils thick. The film and a control film, identically prepared without the compound under test, are exposed to a xenon arc in an Atlas Weather-Ometer ® until they fail. A film is considered as having failed when the carbonyl content of the infrared absorption spectrum increases by 0.10 weight percent, a generally accepted point of film embrittlement.

The data in Table I show the number of hours required to increase the carbonyl content by 0.1% by weight for the compounds under test and a control film.

TABLE I

| Example | Additive | Hours to Failure |
|---|---|---|
| 4 | Product of Example 1 | 300 |
| 5 | Product of Example 2 | 400 |
| 6 | Product of Example 3 | 600 |
|   | None | <200 |

What is claimed is:
1. A polymer prepared by polymerizing, optionally with a comonomer, a compound of the formula (I)

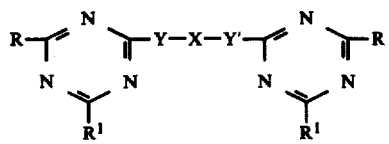 (I)

wherein R represents $C_3$–$C_6$ alkenyloxy, $C_3$–$C_6$ alkenylamino, or di($C_3$–$C_6$ alkenyl)amino; $R^1$ represents $C_1$–$C_8$ alkyl, $C_1$–$C_8$ alkoxy, halo, $C_1$–$C_8$ alkylthio, $C_3$–$C_6$ alkenyloxy, amino, $C_3$–$C_6$ alkenylamino, di($C_3$–$C_6$ alkenyl)amino, the groups

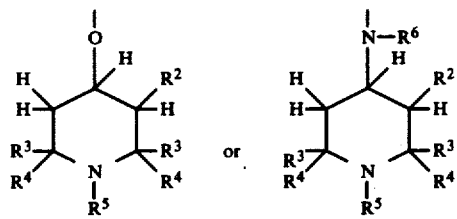

$C_1$–$C_{18}$ alkylamino, di($C_1$–$C_{18}$)alkylamino, morpholino, pyrrolidyl, piperidino, a substituted $C_1$–$C_{18}$ alkylamino, or a substituted di($C_1$–$C_{18}$)alkylamino, wherein the substituents are selected from amino, cyano, carboxy, wherein the alkoxy moiety has 1 to 8 carbon atoms, and the group

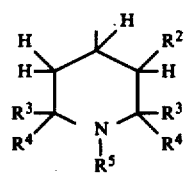

wherein $R^2$ represents hydrogen, $C_1$–$C_8$ alkyl, or benzyl; $R^3$ and $R^4$ independently represent $C_1$–$C_8$ alkyl, benzyl, or phenethyl, or together with the carbon to which they are attached form a $C_5$–$C_{10}$ cycloalkyl; and $R^5$ represents hydrogen, $C_2$–$C_3$ hydroxyalkyl, $C_1$–$C_8$ alkyl, hydroxyl, or oxyl; $R^6$ represents hydrogen, $C_1$–$C_8$ alkyl, or the group

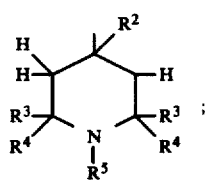

Y and Y', which may be the same, or different, represent oxy, or

X represents $C_2$–$C_{12}$ alkylene, wherein the alkylene chain may be interrputed by an oxo, thio, or

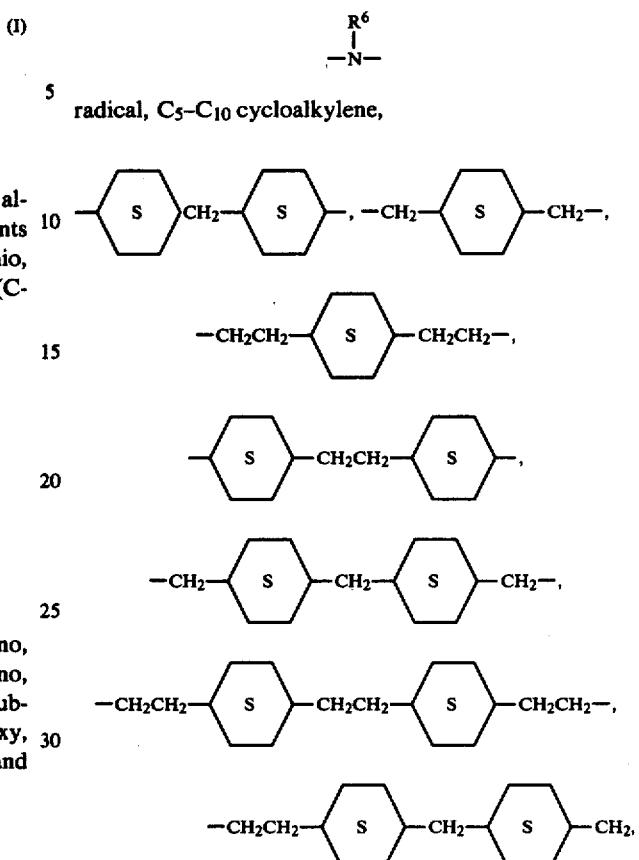

radical, $C_5$–$C_{10}$ cycloalkylene, $C_6$–$C_{12}$ arylene, or $C_8$–$C_{14}$ aralkylene; with the proviso that at least one substituent in said compound is, or contains,

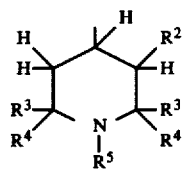

2. The polymer of claim 1 wherein Y and Y' are each

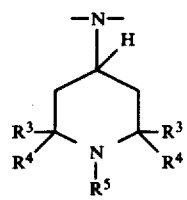

3. The polymer of claim 2 wherein $R^3$ and $R^4$ are each methyl, $R^5$ is hydrogen, and X is $C_2$–$C_{12}$ alkylene.

4. The polymer of claim 1, 2 or 3 wherein R and R' are diallylamino.

5. The polymer of claim 1, 2 or 3 wherein R and R' are allyloxy.

6. The polymer of claim 1, 2 or 3 wherein R is diallylamino and R' is methoxy.

* * * * *